March 10, 1970  SHINOBU FUJIWARA ET AL  3,499,772
CERAMIC DIELECTRICS
Filed Dec. 29, 1967  2 Sheets-Sheet 2

INVENTORS
SHINOBU FUJIWARA
KIYOTO KAWAKAMI

United States Patent Office 3,499,772
Patented Mar. 10, 1970

3,499,772
CERAMIC DIELECTRICS
Shinobu Fujiwara and Kiyoto Kawakami, Akita-ken, Japan, assignors to Tokyo Denki Kagaku Kogyo Kabushiki Kaisha
Continuation-in-part of application Ser. No. 359,131, Apr. 13, 1964. This application Dec. 29, 1967, Ser. No. 694,566
Int. Cl. C04b *35/00, 35/46;* H01b *3/00*
U.S. Cl. 106—39           1 Claim

ABSTRACT OF THE DISCLOSURE

Ceramic dielectric materials are provided which have high dielectric constants, low temperature coefficients and high Q values. The materials consist essentially of a sintered mixture of 6 to 80% by weight of $SrTiO_3$, 5 to 60% by weight of $CaTiO_3$, and 15 to 34% by weight of $Bi_2O_3 \cdot 2TiO_2$.

---

Figure 1:
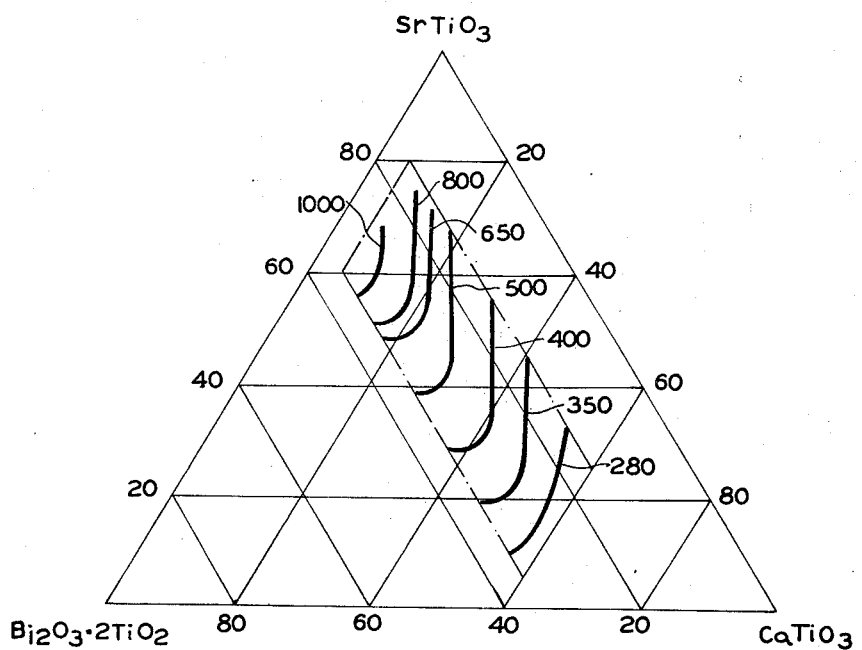

This is a continuation-in-part application of copending application, Ser. No. 359,131, filed Apr. 13, 1964, now abandoned.

This invention relates to improvements in ceramic dielectrics.

An object of the invention is to provide ceramic dielectrics which have relatively high dielectric constants, lower temperature coefficients and high Q-values, and which show excellent characteristics when they are applied in the various communication equipment.

As a ferroelectric material, barium titanate ($BaTiO_3$) has hitherto been well known to be of practical use over a wide electrical field, but its application to the electrical devices has greatly been limited by the existence of the maximum of its dielectric constant at about 120° C., and by the existence of the transition point at about 0° C.

Since $BaTiO_3$ has the property of easily forming a solid solution with isomorphic compounds, the addition of calcium titanate ($CaTiO_3$), magnesium titanate ($MgTiO_3$) and other titanates to $BaTiO_3$ has been tried to obtain a small temperature coefficient. Although the temperature dependence of the dielectric constant of $BaTiO_3$ is improved by the addition of these titanates, the dielectric constant of the body is much lowered resulting in the loss of its practical use.

Other high dielectric materials have also had the similar shortcomings of large temperature coefficients and low Q-values.

The object of the present invention is to provide ceramic dielectrics which are free of the above mentioned shortcomings of other ceramic dielectrics, and which are composed mainly of strontium titanate, calcium titanate, and a mixture of bismuth oxide and titanium oxide, ($SrTiO_3$, $CaTiO_3$ and $Bi_2O_3 \cdot 2TiO_2$) to obtain a high dielectric constant and a small temperature coefficient.

In this invention, in order to obtain the most successful results, the composition of the above three ingredients, according to the detailed experimental discussion, should be limited to the ranges given below:

|  | Percent by wt. |
|---|---|
| $SrTiO_3$ | From 6–80 |
| $CaTiO_3$ | From 5–60 |
| $Bi_2O_3 \cdot 2TiO_2$ | From 15–34 |

The reasons for limiting the above composition are the following:

When the content of strontium titanate $SrTiO_3$ exceeds 80% by weight, the temperature coefficient of dielectric constant of the body becomes too large for practical use and firing temperature is required to be higher than 1380° C. When the content of strontium titanate $SrTiO_3$ is less than 6% by weight, the dielectric constant of the body is lowered to give predominance to the characteristics of calcium titanate $CaTiO_3$ itself, and the body could not be used where high dielectric constant is required. When the content of calcium titanate $CaTiO_3$ is less than 5% by weight, the Q-value of the body is lowered and its dielectric constant depends greatly on temperature. When the content of $Bi_2O_3 \cdot 2TiO_2$ exceeds 34% by weight, both the dielectric constant and the Q-value are lowered and the body has high porosity and vitreous surface. When the content of $Bi_2O_3 \cdot 2TiO_2$ is less than 15% by weight, dielectric constant is low and firing temperature should be as high as 1360° C.

Figure 2:
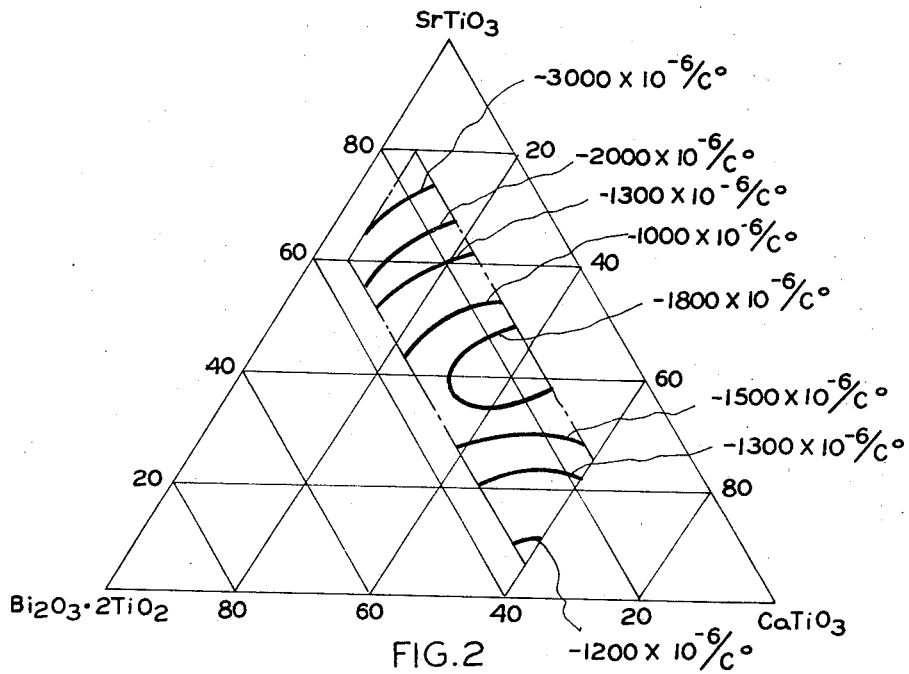
Figure 3:
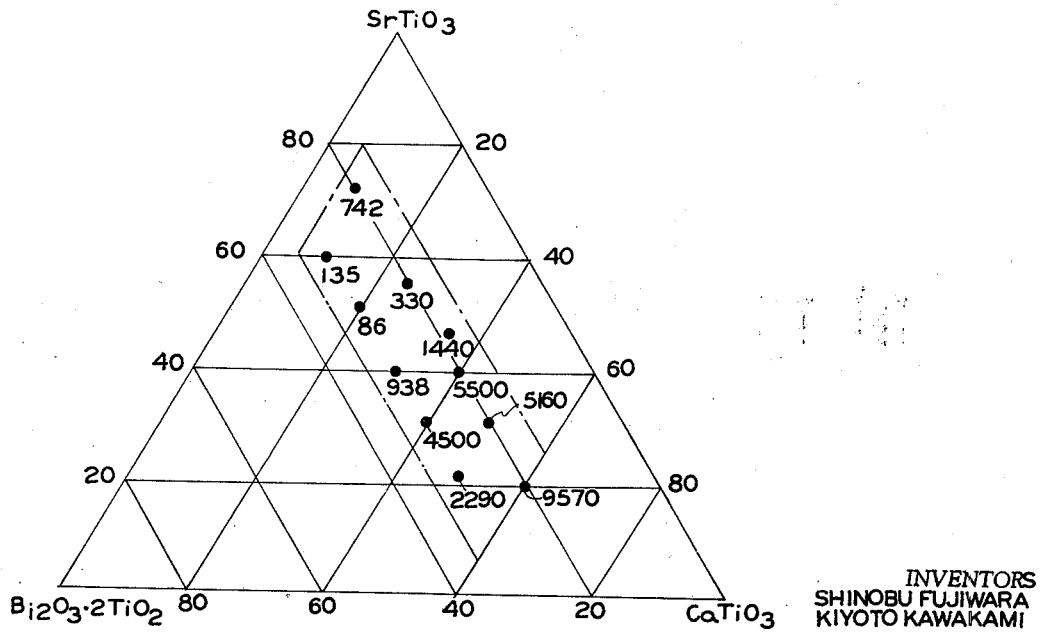

The relations between the three ingredients of the ceramic dielectrics of the invention, i.e. strontium titanate, calcium titanate and mixture of bismuth oxide and titanium oxide ($SrTiO_3$, $CaTiO_3$, and $Bi_2O_3 \cdot 2TiO_2$) and the dielectric constants, the temperature coefficients, and Q-values are given by the triaxial diagrams of FIGURES 1 to 3, where the values indicated refer to the dielectric constants, the temperature coefficients, and the Q-values respectively, and all the values are taken from the measurements at 1 mc./s.

In preparing the ceramic dielectrics of the invention, $SrTiO_3$ and $CaTiO_3$ are first finished by pre-sintering at about 1300° C. and by grinding, and then they are mixed with $Bi_2O_3$ and $TiO^2$. After the mixture is finished by compression molding, the mixture is made up into the dielectrics by sintering at above 1000° C.

In this manner the main ingredients, $SrTiO_3$ and $$CaTiO_3$$

are prefired so that loss of usefulness of the raw materials by moisture absorption during storage can be completely eliminated, and the obtained dielectrics live to expectations sufficiently. Examples of the ceramic dielectrics produced according to the invention are described below in some detail.

EXAMPLE 1

Powdered $SrTiO_3$ and $CaTiO_3$, each of which has been pre-sintered at 1300° C., are mixed with $Bi^2O_3 \cdot 2TiO_2$ at the following ratio:

|  | Parts by wt. |
|---|---|
| $SrTiO_3$ | 60 |
| $CaTiO_3$ | 10 |
| $Bi_2O^3 \cdot 2TiO_2$ | 30 |

The dielectric is made up of the mixture by molding and sintering at 1350° C. This body shows the following characteristics: the dielectric constant=1150, the temperature coefficient $=-2330 \times 10^{-6}$ deg. $^{-1}$ and $Q=135$. These values are obtained by measurement at 1 mc./s, the values given in example described below being also obtained at the same frequency.

EXAMPLE 2

Powered $SrTiO_3$ and $CaTiO_3$, which have been pre-sintered in the same way as in Example 2, are mixed with $Bi_2O_3 \cdot 2TiO_2$ at the following ratio:

|  | Parts by Wt. |
|---|---|
| $SrTiO_3$ | 40 |
| $CaTiO_3$ | 40 |
| $Bi_2O^3 \cdot 2TiO_2$ | 20 |

After molding, the mixture is sintered at 1350° C. to make a dielectric. The body shows the following characteristics: the dielectric constant=357, the temperature coefficient=$1826 \times 10^{-6}$ deg.$^{-1}$ and Q≡5500.

As described above, the application provides ceramic dielectrics which have higher dielectric constant and smaller temperature coefficient in comparison with those hitherto used. Ceramic dielectrics of the application have been applied for practical uses, e.g., as capacitor elements for television tuning circuits and as rotor parts of variable ceramic capacitors, and were found to function excellently. Moreover, dielectrics of the application possess low porosity and dense structure, and this enables them to be used reliably as capacitors under conditions of severe temperature variations or high humidity. Such excellent characteristics were first exhibited by the body of the application.

What is claimed is:
1. A ceramic dielectric consisting essentially of a sintered mixture of 40 parts by weight of $SrTiO_3$, 40 parts by weight of $CaTiO_3$, and 20 parts by weight of

$$Bi_2O_3 \cdot 2TiO_2$$

References Cited

UNITED STATES PATENTS

| 3,069,276 | 12/1962 | Domanski | 106—39 |
| 3,179,525 | 4/1965 | Welsby et al. | 106—39 |

HELEN M. McCARTHY, Primary Examiner

U.S. Cl. X.R.

252—520